United States Patent [19]
Arai et al.

[11] Patent Number: 6,122,402
[45] Date of Patent: Sep. 19, 2000

[54] PATTERN ENCODING AND DECODING METHOD AND ENCODER AND DECODER USING THE METHOD

[75] Inventors: Mitsutoshi Arai; Keiji Yamada; Toshihiko Okamura; Takahiro Hongu; Kouichirou Hirao, all of Tokyo, Japan

[73] Assignee: NEC Corporation, Tokyo, Japan

[21] Appl. No.: 08/984,420

[22] Filed: Dec. 3, 1997

[30] Foreign Application Priority Data

Mar. 12, 1996 [JP] Japan ............................. 8-322742

[51] Int. Cl.$^7$ ...................................... G06K 9/36
[52] U.S. Cl. ...................... 382/232; 382/229; 382/243
[58] Field of Search ............................ 382/141, 232, 382/243, 229, 231

[56] References Cited

U.S. PATENT DOCUMENTS

| | | | |
|---|---|---|---|
| 4,410,916 | 10/1983 | Pratt et al. ............................. | 358/433 |
| 4,606,069 | 8/1986 | Johnsen ................................ | 382/243 |
| 4,885,784 | 12/1989 | Miyagawi et al. .................... | 382/141 |
| 4,922,545 | 5/1990 | Endoh et al. ......................... | 382/243 |
| 5,737,015 | 4/1998 | Juen ..................................... | 348/230 |

OTHER PUBLICATIONS

Paul G. Howard, "Lossless and Lossy Compression of Text Images by Soft Pattern Matching", Project: JTC 1.29.10, ISO/IECJTC1/SC29/WG1, Jun. 30, 1995, pp. 1–29.

*Primary Examiner*—Andrew W. Johns
*Assistant Examiner*—Gregory Desire
*Attorney, Agent, or Firm*—Ostrolenk, Faber, Gerb & Soffen, LLP

[57] ABSTRACT

Pattern encoding is carried out by 1) substituting an index data of a registered pattern for a position data in a library with respect to an index data peculiar to each of the extracted patterns, 2) taking a difference between an off-set position data of the extracted pattern and an off-set position data of the registered pattern whereby an off-set position difference data is provided, and 3) encoding the position data and the off-set position difference data and providing an encoded data. A pattern extracting unit obtains the extracted patterns from image data. An accumulating/checking unit accumulates the extracted patterns as accumulated patterns, assigns indexes specific to the accumulated patterns, and checks each extracted pattern by comparison with the accumulated patterns. When an accumulated pattern is found to match the extracted pattern, the accumulating/checking unit provides a position data within a library instead of the index data, and also provides the off-set position difference data. When no pattern is found to match the accumulated pattern libraries, the accumulating/checking unit provides the off-set position data and bit map data of the extracted pattern to the encoding unit. The arrangement enables the reduction in codes in pattern encoding, thus improving the code transmission efficiency.

7 Claims, 5 Drawing Sheets

(STEP 1) ENCODE LENGTH OF REFERENCE INDEX STRING (STEP 2) ENCODE END POSITION OF REFERENCE INDEX STRING (STEP 3) ENCODE OFF-SET POSITION DIFFERENCE DATA (STEP 4) MATCH-ENCODE EACH PATTERN

LIBRARY

| INDEX | 000 | 001 | 002 | 003 | 004 | 005 | ... | 511 |
|---|---|---|---|---|---|---|---|---|
| PATTERN | (wa) わ | (ta) た | (shi) し | (wa) は | 、 | EMPTY | ... | EMPTY |

REGISTER

PRESENT EXTRACTING PATTERN　　　　"わ (wa)"
NEXT EXTRACTING PATTERN　　　　　　"た (ta)"
NEXT AFTER NEXT EXTRACTING PATTERN　"し (shi)"

PATTERN ENCODING AND DECODING METHOD AND ENCODER AND DECODER USING THE METHOD

BACKGROUND OF THE INVENTION (1) Field of the Invention

The present invention relates to an image data encoding and decoding system, and more particularly to a pattern encoding and decoding method and an encoder and a decoder using the same method, which enables the reduction in codes in pattern encoding.

(2) Description of the Related Art

An encoding method using pattern matching is well known in the prior art for encoding binary image data including mainly character images.

In the prior art method, character images are extracted in small units, for instance, in character-by-character units, from image data (extracted images being hereinafter referred to as "patterns"). Such patterns are extracted by a well-known method such as a boundary tracing method.

Each pattern is compared with preliminarily prepared character image data (hereinafter referred to as "library"). When the same character as the pattern is in the library, the extracted character image is not encoded, but an index number of this character image (index number data) and a position data representing the position of the character image in the image data are encoded. In this way, the encoding efficiency can be improved.

For encoding the above index data and position data, well-known encoding methods such as arithmetic encoding are frequently adopted. For example, "Lossless and Lossy Compression of Test Images by Soft Pattern Matching" uses, for index number data and position data encoding, codes which are developed from the arithmetic encoding method so as to permit processing of multivalue data such as numerical data (called "multi-symbol arithmetic codes").

The index number data and the position data increase proportionally with an increase in the number of patterns. This means that, in the case of image data in which there is a possibility for the number of patterns to become extremely large such as when the image data contains Japanese characters, the amount of data to be encoded will inevitably be large.

As shown, in the above prior art encoding system, when the number of patterns becomes large in encoding a character image using pattern matching, the index number data and the position data will inevitably be large. As a consequence, the proportion of the total code is occupied by the index number data and the position data becomes large, resulting in the deterioration of encoding efficiency. Accordingly, there has been a need for a method which enables efficient encoding of the index number data and the position data.

SUMMARY OF THE INVENTION

An object of the invention, therefore, is to overcome the problems existing in the prior art and to provide a pattern encoding method and apparatus with which the amount of codes in pattern encoding can be reduced so as to improve the code transmission efficiency and to enhance the accumulation ratio in code accumulation, and also a pattern decoder which is used with this pattern encoding apparatus.

According to one aspect of the invention, there is provided a pattern encoding method in which patterns are extracted from inputted binary or multivalued image data and the extracted patterns are encoded, the method comprising the steps of: a first step of substituting an index data of a registered pattern for a position data in a library with respect to an index data specific to each of the extracted patterns; a second step of taking a difference between an off-set position data of the extracted pattern and an off-set position data of the registered pattern, thereby providing an off-set position difference data; and a third step of encoding the position data and the off-set position difference data and providing an encoded data.

According to the invention, a pattern encoder in which binary or multivalue image data are inputted, patterns are extracted from the image data, and extracted patterns are encoded, the encoder comprising: a pattern extracting means for obtaining extracted patterns from the image data; an index assigning means for accumulating the extracted patterns as accumulated patterns in a memory and assigning indexes specific to the accumulated patterns; a data providing means for checking each of the extracted patterns by comparison thereof with the accumulated patterns to find a match between the extracted pattern and the accumulated patterns and, when the match pattern is found, providing a position data in a library instead of the index data and also an off-set position difference data representing a difference between an off-set position data of the extracted pattern and an off-set position data of the accumulated pattern while, when no match pattern in the library is found, providing the off-set position data and bit map data of the extracted pattern; and an encoding means for receiving and encoding output data from the data providing means and providing encoded data. The encoded data is code data containing, in a mixed form, the position data in the library, the off-set position data of the extracted pattern, the off-set position difference data and the bit map data of the extracted pattern.

According to the invention, a pattern decoder comprising a checking means for receiving and decoding the code data and checking the type of the decoded data, a first image reconstructing means for reconstructing the image data by taking out a pattern from the memory according to the position data in the library and positioning the taken-out pattern on the image data according to the off-set position data of the taken-out pattern, a second image reconstructing means for reconstructing the image data by positioning a pattern which is present at a position represented by the position data in the library, at a position represented by the sum of the off-set position data and the off-set position difference data, and a storing means for positioning the bit map data according to the off-set position data while storing the same in the memory.

BRIEF DESCRIPTION OF THE DRAWINGS

The above and other objects, features and advantages of the present invention will be apparent from the following description a preferred embodiment of the invention explained with reference to the accompanying drawings, in which.

PREFERRED EMBODIMENT OF THE INVENTION

Now, a preferred embodiment of the invention is explained with reference to the drawings.

Figure 1:
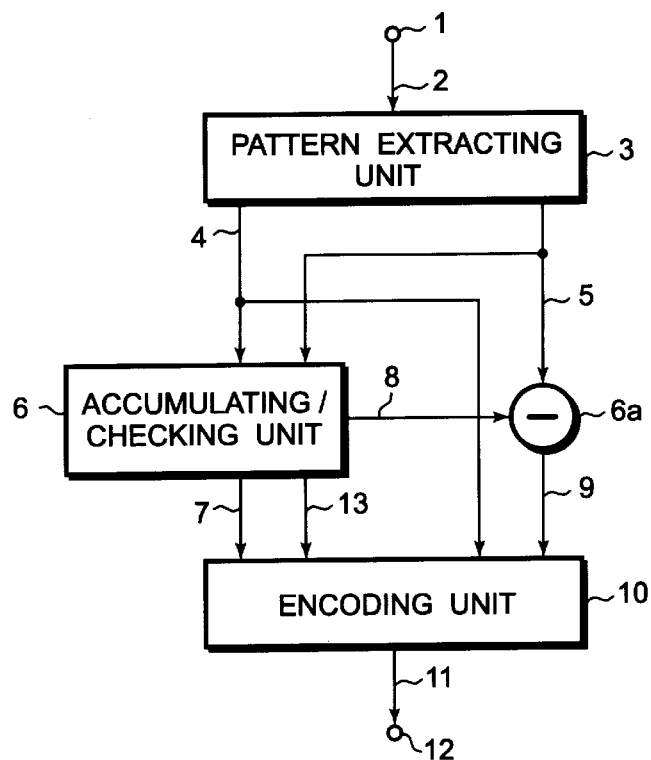
FIG. 1 is a block diagram showing a pattern encoder embodying the invention.

FIG. 1 shows a pattern encoder which comprises a pattern extracting unit 3, an accumulating/checking unit 6, and an encoding unit 10.

Figure 2:
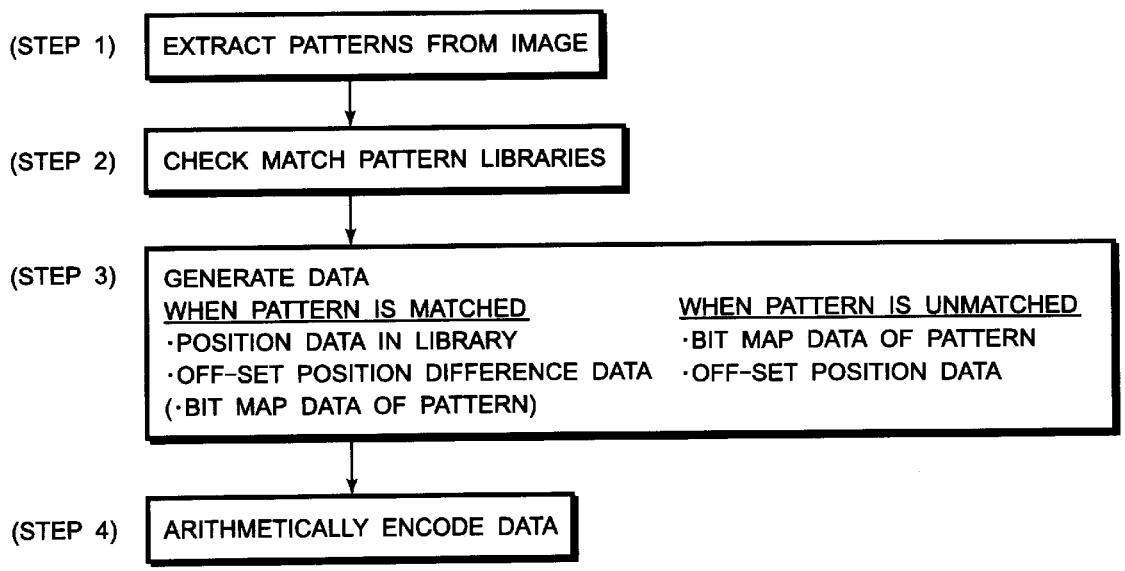
FIG. 2 is a flow chart for showing the pattern encoder embodying the invention.

Referring to FIG. 2, the pattern extracting unit 3 extracts patterns 4 from image data 2 which are supplied from an input terminal 1 and which contain character images (step 1). When extracting patterns, the pattern extracting unit 3 also obtains a position data of the image data within the page. The position data is relative position data of each pattern with respect to the immediately preceding pattern (hereinafter referred to as "off-set position data"). The pattern extraction is made by using a boundary tracing method, for instance.

The extracted patterns 4 and off-set position data 5 thus obtained are supplied to and accumulated in the accumulating/checking unit 6. The accumulating/checking unit 6 checks an extracted pattern by comparison thereof with accumulated patterns (hereinafter referred to as "libraries") to find those which match the extracted pattern (step 2). When a match is found in the match check, the accumulating/checking unit 6 provides a position data 7 of the match pattern in the libraries and also off-set position data 8 of the match pattern (step 3).

The off-set position data 8 of the match pattern is supplied to a subtracter 6a. The subtracter 6a takes the difference between the off-set position data 8 and the off-set position data 5 of the extracted pattern, and supplies the difference as off-set position difference data 9 to the encoding unit 10.

The encoding unit 10 encodes the received position data 7 and the off-set position difference data 9 by arithmetic encoding, for instance, and provides a code 11 which is outputted from an output terminal 12 (step 4). When the extracted pattern is matched, the match pattern (bit data) 13 may be supplied to the encoding unit 10, in which case the extracted pattern 4 may be encoded by using the match pattern 13 (in the case of loss-less encoding, a bit map data becomes necessary).

When no match is found (i.e., when the extracted pattern is unmatched), the accumulating/checking unit 6 provides zero as match pattern off-set position data 8 (step 3). In this case, the off-set position difference data 9 is thus the same as the off-set position data 5 of the extracted pattern. The extracted pattern 4, when unmatched, is supplied together with the off-set position difference data 9 to the encoding unit 10, which thus encodes the pattern 4 and off-set position difference data 9 and provides the code 11.

Figure 3:
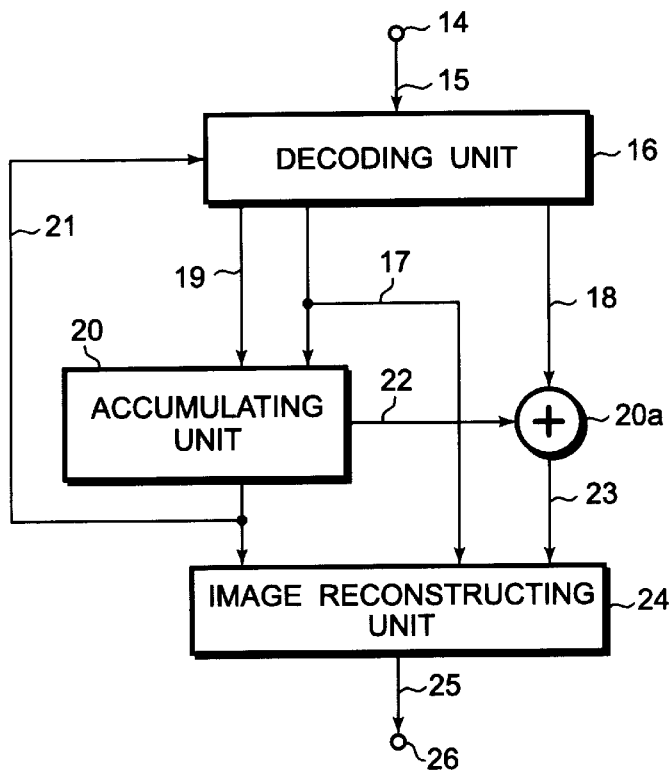
FIG. 3 is a block diagram for showing a pattern decoder embodying the invention.
Figure 4:
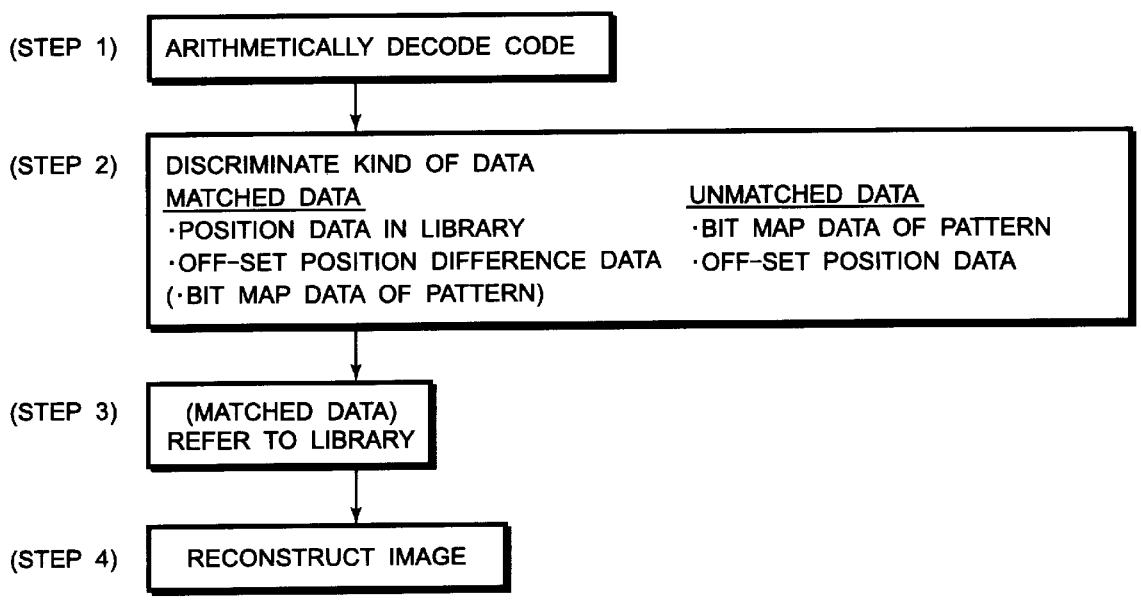
FIG. 4 is a flow chart for showing the operation of the pattern decoder embodying the invention.

A pattern decoder embodying the invention will now be described with reference to FIGS. 3 and 4.

The illustrated decoder comprises a decoding unit 16, an accumulating unit 20 and an image reconstructing unit 24. The code 11 explained above is supplied as code 15 from an input terminal 14. The decoding unit 16 decodes the code 15 (step 1). The decoding unit 16 decodes the code which has been produced by arithmetic encoding, for instance, and provides a pattern 17, an off-set position difference data 18 and a position data 19. The position data 19 is supplied to the accumulating unit 20, and a check is made as to whether the position data 19 is contained in the library (step 2). When the position data 19 is in the library, the accumulating unit 20 calls out a pattern (data) among the patterns accumulated in the library, and provides this pattern as a reference pattern 21.

The accumulating unit 20 further provides an off-set position data 22 of the reference pattern 21 to an adder 20a. The adder 20a adds together the off-set position data 22 and the off-set position difference data 18, and supplies the sum as off-set position data (added position data) 23 to the image reconstructing unit 24 (step 3).

The image reconstructing unit 24 reconstructs an image by positioning the reference pattern 21 or the pattern 17 in accordance with the off-set position data 23 (step 4). The reconstructed image is provided as image data 25 from an output terminal 26.

Figure 5:
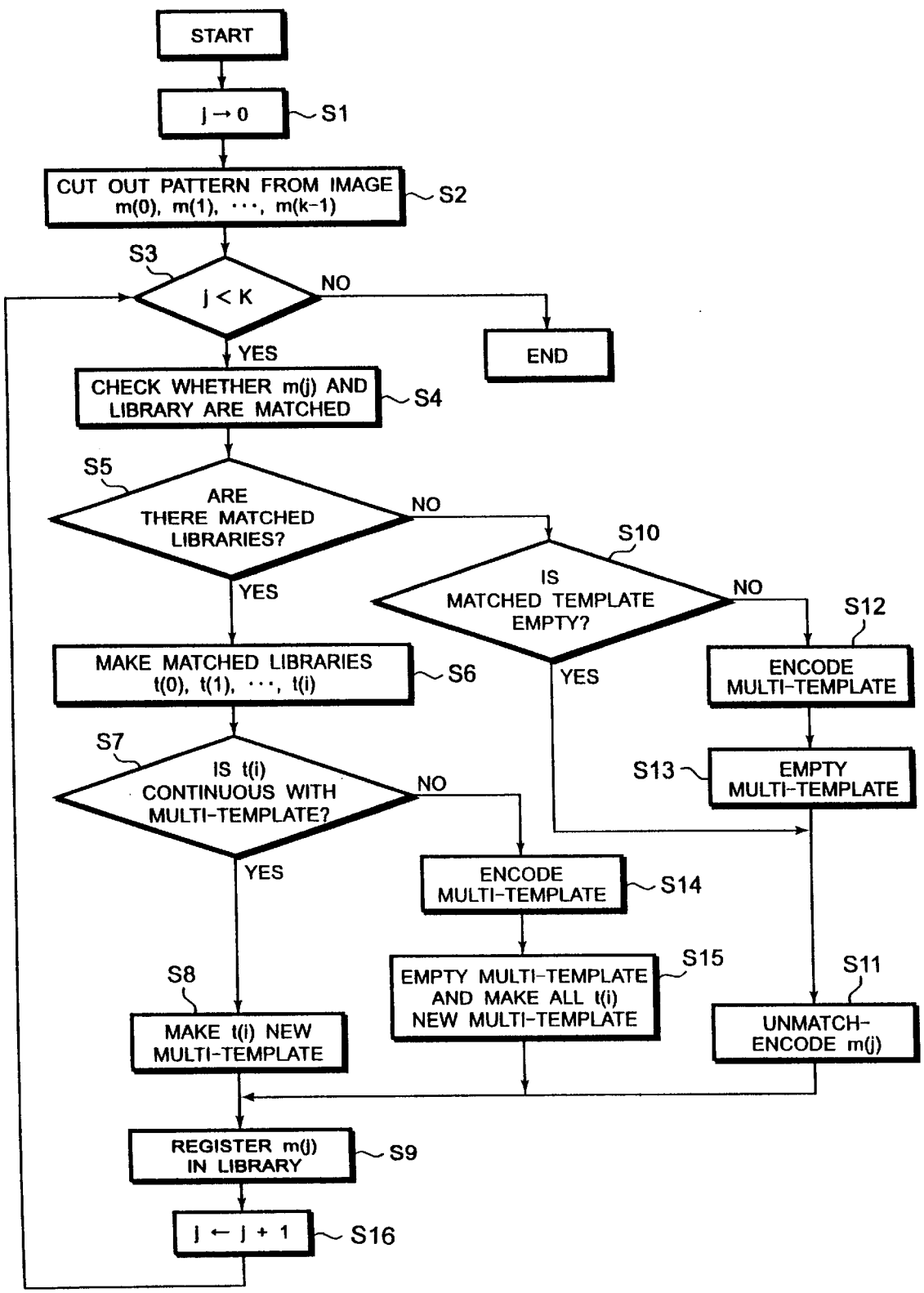
FIG. 5 is a flow chart for describing the operation of a specific example of encoding method according to the invention.

The encoding method according to the invention will now be described in detail with reference to FIG. 5.

From the image data, character images are cut out as character units m(0), m(1), ..., m(K-1). The cut-out character images are referred to as "patterns".

First, by setting j=0 (step S1), character images are cut out from the image data (step S2). When j<K (step S3), pattern m(j) is checked in comparison with a preliminarily prepared character image (hereinafter referred to as "library") as to whether it is matched therewith (step S4).

The libraries are provided with serial numbers, which are called indexes. The term "matched" is meant for an image which is highly likely to be the same character.

When matched images are among the libraries (step S5), these matched images are provided as libraries t(0), t(1), ..., t(i) (step S6). Then, each library t(i) is checked as to whether it is continuous from multi-template origin (step S7). The term "multi-template" is defined as a variable area which can store a plurality of patterns. The initial value of the multi-template is "blank". By the term "continuous from multi-template origin" regarding t(i), the value immediately preceding t(i) is in the multi-template. The value immediately preceding t(i) is the value of m(j-1) when the pattern matched to t(i) is assumed to be m(j). When j=0, all the libraries t(i) are continuous from the multi-template origin.

When there is even one library t(i) which is continuous from the multi-template origin, the content of the multi-template is initialized to be blank, and this library t(i) is set as a new multi-template (step S8). Then, the pattern m(j) is registered in the library (step S9).

When no match image among the libraries is found in the step S5, a check is made as to whether the multi-template is blank (step S10). When the multi-template is blank, the pattern m(j) is unmatch encoded (step S11), and then the step S9 is executed.

When it is found in the step S10 that the multi-template is not blank, the multi-template is encoded (step S12), and the multi-template is initialized to be blank (step S13). Thereafter, in the step S11, the pattern m(j) is unmatch encoded, and the subsequent step S9 is executed.

When it is found in the step S7 that the library t(i) is not continuous to the multi-template origin, the multi-template is encoded (step S14). Then, the multi-template is initialized to be blank, thus providing a new multi-template for all the libraries t(i) (step S15). Subsequently, the step S9 is executed.

After registering the pattern m(j) in the library in the step S9, j is incremented to j=j+1 (step S16), and the routine goes back to the step S3. When it is found in the step S3 that j≧K, an end is brought to the routine.

In the above steps, the last character in a character string of libraries which corresponds to an input character string in the largest number of characters, is always in the multi-template. When there is no t(i) at all that continues from the multi-template origin, the multi-template value is multi-template encoded as described above.

The procedure of the multi-template encoding will now be described with reference to FIG. 6.

Figure 6:
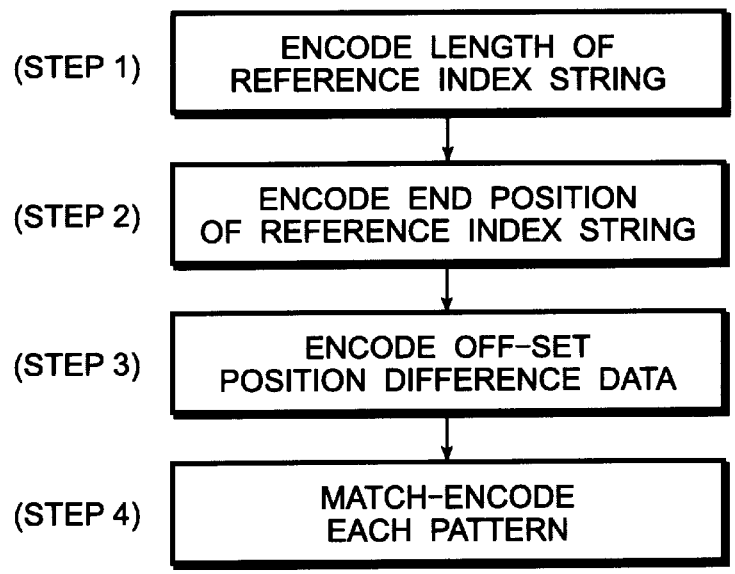
FIG. 6 is a diagram for showing the procedure of multi-template encoding in the encoding method shown in FIG. 5.

Referring to FIG. 6, the term "reference index string" refers to a string of indexes of the libraries. The end position of the reference index string becomes the position of the present index relative to the index number represented by the multi-template value.

The length of the reference index string indicates the number of match patterns between the patterns matched the index up to the present and the patterns matched the index represented by the multi-template.

In step S1, the length of th reference index string is encoded. Then, in step S2 the end position of reference index string is encoded. Then, the off-set position difference data is encoded (step S3), and finally each pattern is match encoded (step S4).

By encoding the length and end position of the reference index string instead of directly encoding the reference index string, it is possible to reduce the amount of data. By the term "match encoding" is meant encoding the bit map of the pattern with the match libraries being referred to. It is well known in the art that doing so enables the realization of higher encoding efficiency as compared with the case wherein only the pattern is encoded by a well-known method such as JBIG standard. In the case where a library pattern is substituted for the extracted pattern, the match encoding is unnecessary.

Figure 7:
FIG. 7 is a diagram for specifically showing the multi-template encoding in the encoding method shown in FIG. 5.

FIG. 7 shows an example of library configuration. In the reference index string encoding as exemplified here, the maximum number of patterns which can be registered in libraries is set to 512. In such a case, in the prior art encoding (i.e., directly encoding the index string), indexes "005", "006" and "007" correspond to patterns "wa" "ta" and "shi" (Roman characters corresponding to Japanese hiragana characters). Since the maximum number of pattern indexes is $512=2^9$, nine bits are necessary for each character. That is, the three characters require encoding 9×3=27 bits.

In contrast, in the multi-template encoding according to the invention, the indexes "000" to "002" together corresponding to "wa ta shi" constitute a reference index string, and two different kinds of data, i.e., one representing the length of the reference index string (i.e., three characters) and the other representing the end position of the reference index string (i.e., three characters before "005") are encoded. If the maximum number of characters which can be represented by the reference index string is 16, the length can be expressed by 4 bits, and if the end position of the reference index string is the same as the maximum number of patterns in libraries, it can be expressed by 9 bits. In this case, it is only necessary to encode 4+9=13 bits.

When the multi-template encoding in the above way has been ended, the multi-template is initialized to be blank, so that all the libraries t(j) become the multi-template afresh. Then, pattern m(j) is registered in library. The pattern is registered in the library regardless of whether it is matched or not. In the library, the pattern is stored with a newest index number assigned thereto. The index number is incremented by one each whenever a pattern is stored. When a pattern has been registered in a library, j is incremented by one as described before to be ready for the processing of the next pattern.

As already described, when no pattern among the libraries matches the pattern m(j), a check is made as to whether the multi-template is blank. When the multi-template is found to be blank, the pattern is merely unmatch encoded. The term "unmatch encoding" means that the pattern itself is encoded by a well-known encoding process such as JBIG standard. When the multi-template is not blank, multi-template encoding is first done, and then the multi-template is initialized to be blank. Thereafter, the same process as in the case when the multi-template is not blank is executed.

The decoding will now be described with reference to FIG. 8.

The code is first decoded (step S1). Then, a check is made for the end of the code (step S2). An end identification code is provided at the end of the code.

When no code end is found, a check is made as to whether the decoded data is a position data in the library (step S3). This check can be readily made since the data is provided with a data identification code. When the checked data is found to be a position data in the library, the pertinent pattern and the off-set position data are called out by referring to the library (step S4). Then, the off-set position difference data is decoded, and the decoded data is added to the off-set position data in the library (step S5). Then, the pattern is positioned at the position represented by the off-set position data for image reconstruction (step S6).

When it is found in the step S3 that the decoded data is not a position data in the library, a check is made as to whether the decoded data is the bit map of the pattern (step S7). Since the decoded data is the bit map of the pattern, the off-set position data is decoded (step S8). Then, the bit map of the pattern is positioned at the position represented by the off-set position data for image reconstruction (step S6).

Figures 8, 9:
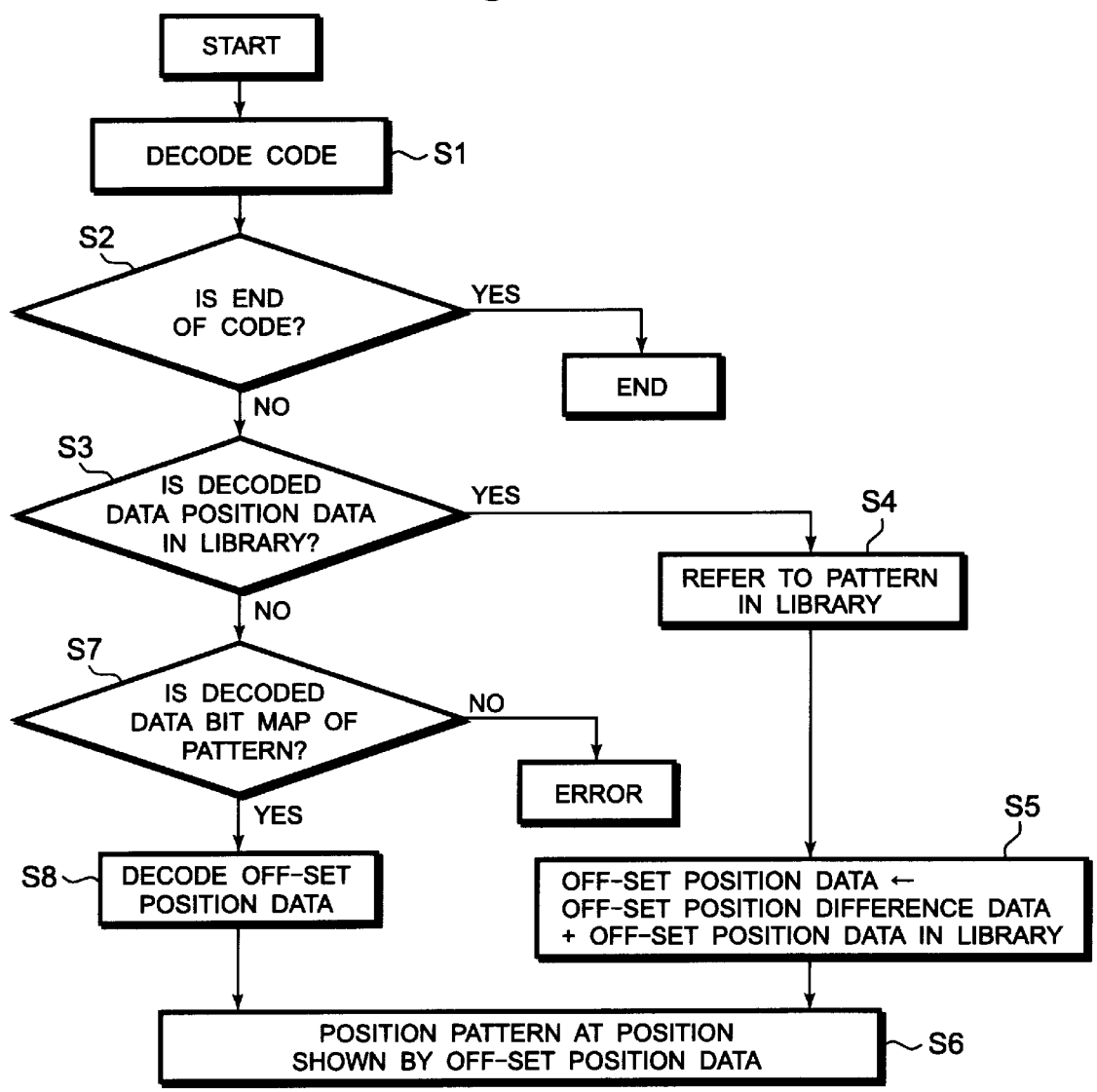
FIG. 8 is a flow chart for showing the operation of a specific example of decoding method according to the invention.
FIG. 9 is a diagram for specifically showing processing in the encoding method shown in FIG. 5.

Referring to FIG. 9, the pattern row shows character images cut out from the image. Character images "a", "b", "a", "b", "a", "c", . . . as shown, are inputted in the listed order. The term "registered index" means the index number is assigned to a pattern when the pattern is registered in a library. According to the invention, all patterns are registered in libraries, and registered indexes are incremented one by one.

The term "reference index" refers to the index of a match library. For example, when the pattern "a" of registered index "2" is matched by the pattern "a" of registered index "0", the reference index is "0". To the multi-template, a reference index number continuous from that of the immediately preceding multi-template is provided. For example, the pattern "a" of registered index "4" is matched by the pattern "a" of registered index "0" and the pattern "a" of registered index "2". In this case, the number of the immediately preceding multi-template (i.e., the multi-template of registered index "3") is "1", that is, the number continuous from this multi-template (i.e., number continuous from "1") is "2". Thus, only the reference index "2" among the reference indexes "0" and "2" is selected and assigned as the new multi-template.

In the row of "encoding", U(a) represents the unmatch encoding of the pattern "a", and M(aba) represents the multi-template encoding of the patterns "a", "b" and "a".

As has been described in the foregoing, according to the invention, it is possible to reduce the amount of index data in pattern encoding to improve the encoding efficiency. It is thus possible to reduce the memory capacity for data accumulation and also reduce time necessary for data transmission.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A pattern encoding method in which patterns are extracted from inputted binary or multivalued image data and the extracted patterns are encoded, the method comprising the steps of:

a first step of substituting an index data of a registered pattern for a position data in a library with respect to an index data specific to each of the extracted patterns;

a second step of taking a difference between an offset position data of said extracted pattern and an off-set position data of said registered pattern, thereby providing an off-set position difference data; and a third step of encoding said position data and said off-set position difference data and providing an encoded data.

2. The pattern encoding method according to claim 1, which further comprises a fourth step of checking whether said extracted pattern is matched by said registered pattern, said third step of encoding said position data and said off-set position difference data for providing said encoded data being executed when said extracted pattern is matched.

3. The pattern encoding method according to claim 2, which further comprises a fifth step of providing said offset position data and bit map data of said extracted pattern when said extracted pattern is not matched, and a sixth step of encoding said off-set position data and said bit map data and providing encoded data.

4. A pattern decoding method for decoding the data encoded by the encoding method according to claim 3, said decoding method comprising a step of decoding the encoded data, and a step of checking a kind of said decoded data and reconstructing the image data according to the result of the checking.

5. A pattern encoder in which binary or multivalue image data are inputted, patterns are extracted from the image data, and extracted patterns are encoded, said encoder comprising:

a pattern extracting means for obtaining extracted patterns from said image data;

an index assigning means for accumulating said extracted patterns as accumulated patterns in a memory and assigning indexes specific to said accumulated patterns;

a data providing means for checking each of said extracted patterns by comparison thereof with said accumulated patterns to find a match between said extracted pattern and said accumulated patterns and, when a matching pattern is found, providing a position data in a library instead of the index data and also an off-set position difference data representing a difference between an off-set position data of said extracted pattern and an off-set position data of said accumulated pattern and, when no match pattern in the library is found, providing the off-set position data and bit map data of said extracted pattern; and an encoding means for receiving and encoding output data from said data providing means and providing encoded data.

6. The pattern encoder according to claim 5, wherein said encoded data are code data containing, in a mixed form, said position data in said library, said off-set position data of said extracted pattern, said off-set position difference data and said bit map data of said extracted pattern.

7. A pattern decoder for decoding the data encoded by the encoder according to claim 6, said decoder comprising a checking means for receiving and decoding said code data and checking a type of the decoded data, a first image reconstructing means for reconstructing the image data by taking out a pattern from the memory according to the position data in the library and positioning said taken-out pattern on the image data according to the off-set position data of the taken-out pattern, a second image reconstructing means for reconstructing the image data by positioning a pattern, which is present at a position represented by the position data in the library represented by the sum of said off-set position data and said off-set position difference data, and a storing means for positioning said bit map data according to said off-set position data while storing the same in said memory.

* * * * *